(12) United States Patent
Rawlings et al.

(10) Patent No.: US 9,545,996 B2
(45) Date of Patent: Jan. 17, 2017

(54) SHAPE MEMORY RIBLETS

(71) Applicant: The Boeing Company, Chicago, IL (US)

(72) Inventors: Diane C. Rawlings, Bellevue, WA (US); Terry L. Schneider, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 14/105,027

(22) Filed: Dec. 12, 2013

(65) Prior Publication Data

US 2014/0099475 A1  Apr. 10, 2014

Related U.S. Application Data

(63) Continuation of application No. 12/361,882, filed on Jan. 29, 2009, now Pat. No. 8,668,166.

(51) Int. Cl.
| | | |
|---|---|---|
| *B64C 21/10* | (2006.01) | |
| *B32B 3/30* | (2006.01) | |
| *B32B 15/08* | (2006.01) | |
| *B32B 15/20* | (2006.01) | |
| *B32B 27/28* | (2006.01) | |
| *B32B 27/34* | (2006.01) | |
| *B32B 27/38* | (2006.01) | |
| *B32B 27/40* | (2006.01) | |
| *F15D 1/00* | (2006.01) | |

(52) U.S. Cl.
CPC ............ *B64C 21/10* (2013.01); *B32B 3/30* (2013.01); *B32B 15/08* (2013.01); *B32B 15/20* (2013.01); *B32B 27/283* (2013.01); *B32B 27/288* (2013.01); *B32B 27/34* (2013.01); *B32B 27/38* (2013.01); *B32B 27/40* (2013.01); *F15D 1/004* (2013.01); *B32B 2307/416* (2013.01); *B32B 2307/702* (2013.01); *B32B 2605/18* (2013.01); *B64C 2230/26* (2013.01); *F15D 1/0035* (2013.01); *F15D 1/0045* (2013.01); *Y02T 50/166* (2013.01); *Y10T 428/2457* (2015.01); *Y10T 428/24537* (2015.01)

(58) Field of Classification Search
CPC ............ B32B 15/08; B32B 3/30; B64C 21/10; B64C 2230/26; Y02T 50/166; Y10T 428/2437; Y10T 428/2457
USPC .......................................... 428/156, 167, 169
See application file for complete search history.

(56) References Cited

U.S. PATENT DOCUMENTS

| | | | | |
|---|---|---|---|---|
| 5,069,403 | A * | 12/1991 | Marentic | B05D 5/02 244/130 |
| 5,164,245 | A * | 11/1992 | Suzuki | B32B 27/08 428/201 |
| 5,686,003 | A * | 11/1997 | Ingram | B64D 15/12 219/201 |
| 6,363,747 | B1 | 4/2002 | Budinski et al. | |
| 2004/0086704 | A1 * | 5/2004 | Schneider | B32B 5/16 428/323 |
| 2005/0003146 | A1 * | 1/2005 | Spath | A63C 5/04 428/105 |

(Continued)

*Primary Examiner* — Aaron Austin
*Assistant Examiner* — Alicia Sawdon
(74) *Attorney, Agent, or Firm* — Felix L. Fischer

(57) ABSTRACT

A multilayer construction for an array of aerodynamic riblets incorporates a first layer composed of a material with protuberances, the first layer material having shape memory and a second layer composed of a material exhibiting a second characteristic with capability for adherence to a surface.

7 Claims, 13 Drawing Sheets

(56) References Cited

U.S. PATENT DOCUMENTS

2005/0121946 A1* 6/2005 McKnight ............ B60K 11/085
   296/180.1
2010/0080958 A1* 4/2010 Goelling ................ B32B 15/08
   428/172

* cited by examiner

SHAPE MEMORY RIBLETS

REFERENCE TO RELATED APPLICATIONS

This application is a continuation of application Ser. No. 12/361,882 filed on Jan. 29, 2009 entitled Shape Memory Riblets is copending with U.S. patent application Ser. No. 12/361,840 filed on Jan. 29, 2009 entitled Rigid Tipped Riblets and U.S. patent application Ser. No. 12/361,918 filed file on Jan. 29, 2009 entitled Amorphous Metal Riblets, all having a common assignee with the present application, the disclosures of which are incorporated herein by reference.

BACKGROUND INFORMATION

Field

Embodiments of the disclosure relate generally to the field of surface geometries for aerodynamic improvements to aircraft or surfaces having a flow interface and more particularly to embodiments and fabrication methods for use of shape memory materials to form aerodynamic riblets or other high-aspect-ratio surface microstructures requiring high durability.

Background

Increasing fuel efficiency in modern aircraft is being accomplished through improvement in aerodynamic performance and reduction of structural weight. Recent advances in the use of microstructures such as riblets on aerodynamic surfaces have shown significant promise in reducing drag to assist in reducing fuel usage. Riblets have various forms but advantageous embodiments may be ridge-like structures that minimize drag on the surface of an aircraft. Riblets may be used in areas of a surface of an aircraft where turbulent regions may be present. Riblets may limit circulation causing a breakup of large scale vortices in these turbulent regions near the surface in the boundary layer to reduce drag.

In certain tested applications riblets have been pyramidal or inverted V shaped ridges spaced on the aerodynamic surface to extend along the surface in the direction of fluid flow. Riblet structures have typically employed polymeric materials, typically thermoplastics. However in service use such as on an aircraft aerodynamic surface, polymers are relatively soft thus reducing the durability of the surface. Existing solutions with polymeric tips may readily deform hundreds of percent with fingernail pressure and may be unrecoverable. Such structures may be undesirable in normal service use on an aircraft or other vehicle. Additionally aircraft surfaces are typically required to withstand interactions with various chemicals including SKYDROL®, a hydraulic fluid produced by Solutia, Inc. In certain applications elastomers that resist or recover from severe deformation created at the tip may be employed to form the riblets. However, many elastomers and other polymers may not be compatible with SKYDROL® hydraulic fluid or other aircraft fluids or solvents.

The practicality of riblets for commercial aircraft use would therefore be significantly enhanced with a riblet structure providing increased durability and aircraft fluids compatibility.

SUMMARY

Exemplary embodiments provide a multilayer construction having a first layer composed of a material with riblets, the first layer material exhibiting a first characteristic of being a shape memory material and a second layer composed of a material exhibiting a second characteristic with capability for adherence to a surface. The multilayer construction is employed in exemplary embodiments wherein the riblets are implemented on a vehicle, the riblets having long-term durability due to the shape memory of the first layer.

In various embodiments, an array of aerodynamic riblets is created by a plurality of shape memory tips with a layer supporting the shape memory tips in predetermined spaced relation and adhering the shape memory tips to a vehicle surface. In exemplary embodiments, the shape memory tips are formed from material selected from the set of copper-zinc-aluminum-nickel, copper-aluminum-nickel, nickel-titanium (NiTi), as well as a nickel-free, pseudo-elastic beta titanium alloy. Additionally, the supporting layer may be continuously cast with the tips as a surface layer. Alternatively, a polymer support layer is deposited on the surface layer opposite the tips. An adhesive layer deposited on the polymer support layer forms a multilayer appliqué and provides the capability for adhering the appliqué to the vehicle surface.

In another exemplary embodiment, the supporting layer is an elastomeric layer engaging the tips and a metal foil and a polymer layer are provided intermediate the elastomeric layer and the adhesive layer. The metal foil, polymer layer and adhesive layer may be provided as a preformed appliqué. For exemplary embodiments using the elastomeric layer, the tips each incorporate a base and each base may be embedded in the elastomeric layer.

In one aspect of the embodiment for greater flexibility in certain applications, each tip is longitudinally segmented.

An exemplary embodiment provides an aircraft structure including an array of aerodynamic riblets having a plurality of longitudinally segmented shape memory tips formed from material selected from the set of copper-zinc-aluminum-nickel, copper-aluminum-nickel, nickel-titanium (NiTi) and nickel-free, pseudo-elastic beta titanium alloy or shape memory polymer. A polymer support layer selected from the set of polyurethanes, silicones, epoxy, polysulfide, ethylene propylenediene, fluorosilicone, and fluoroelastomers, engages the tips and a cladding selected from the set of copper-zinc-aluminum-nickel, copper-aluminum-nickel, nickel-titanium (NiTi), pseudo-elastic beta titanium alloys, nickel, chromium, metal alloys, glass, ceramics, silicon carbide or silicon nitride overlays the tips and surface layer. An adhesive layer deposited on the polymer support layer forms a multilayer appliqué and the adhesive layer adheres the appliqué to a surface of the aircraft.

The embodiments disclosed are fabricated in an exemplary method by forming a master tool having protuberances corresponding to a desired riblet array and forming a complementary tool from the master tool. A plurality of shape memory tips is then deposited in the master tool using electroforming or other desirable deposition technique. The shape memory tips are then removed from the complementary tool and adhered to an aerodynamic surface.

In exemplary aspects of the method, resist is applied to the base of the shape memory tips for segregating the shape memory tips and removed subsequent to etching the rigid tips. An elastomeric layer is then cast engaging the rigid tips and a preformed appliqué is applied to the elastomeric layer to form a multilayer riblet array appliqué.

In exemplary embodiments of the method, the preformed appliqué comprises a metal foil, a polymer support layer and an adhesive layer. An adhesive liner and masking may be employed for handling. The riblet array may then be adhered to the aerodynamic service by removing the adhesive liner and applying the multilayer riblet array appliqué to the aerodynamic surface and removing the masking.

In an alternative method, casting the plurality of shape memory tips includes casting of the plurality of SMA tips and an intermediate surface layer as a cladding. An elastomeric layer is then cast to the cladding. The elastomeric layer in alternative embodiments is also a shape memory material. In yet another alternative method, a second SMA is cast into the cladding. In other aspects of the method, the core of elastomeric shape memory material or SMA is cast in the tool, removed and the cladding of SMA, rigid material or amorphous metal is then deposited on the core.

In a further alternative method for web processing, the complimentary tool is a web tool and a metal coating is sputtered on the web tool prior to depositing the shape memory tips on the web tool. In one aspect of this method, resist is applied over the sputtered metal coating and depositing the shape memory tips is accomplished by electroforming shape memory tips on the sputtered metal coating in the web tool.

A method for creating an array of aerodynamic riblets on an aircraft surface includes creating a master tool and creating a complimentary tool by impression on the master tool to provide grooves corresponding to the riblet shape. Spacing between the grooves provides a substantially flat intermediate surface. A core layer selected from the set of elastomers, shape memory polymers or shape memory alloys is cast into the complimentary tool to provide both a support layer and tip cores. An adhesive layer is applied to the surface layer opposite the cores. A removable adhesive liner is added for handling. The core layer is then removed from the complimentary tool and a cladding selected from the set of shape memory alloys, nickel, chromium, glass, ceramics, silicon carbide or silicon nitride or amorphous metals, is deposited onto the core layer to form tips and a surface layer. The adhesive liner is then removed and the adhesive layer is attached to an aircraft surface.

BRIEF DESCRIPTION OF THE DRAWINGS

The features and advantages of embodiments disclosed herein will be better understood by reference to the following detailed description when considered in connection with the accompanying drawings wherein.

DETAILED DESCRIPTION

Figure 1:
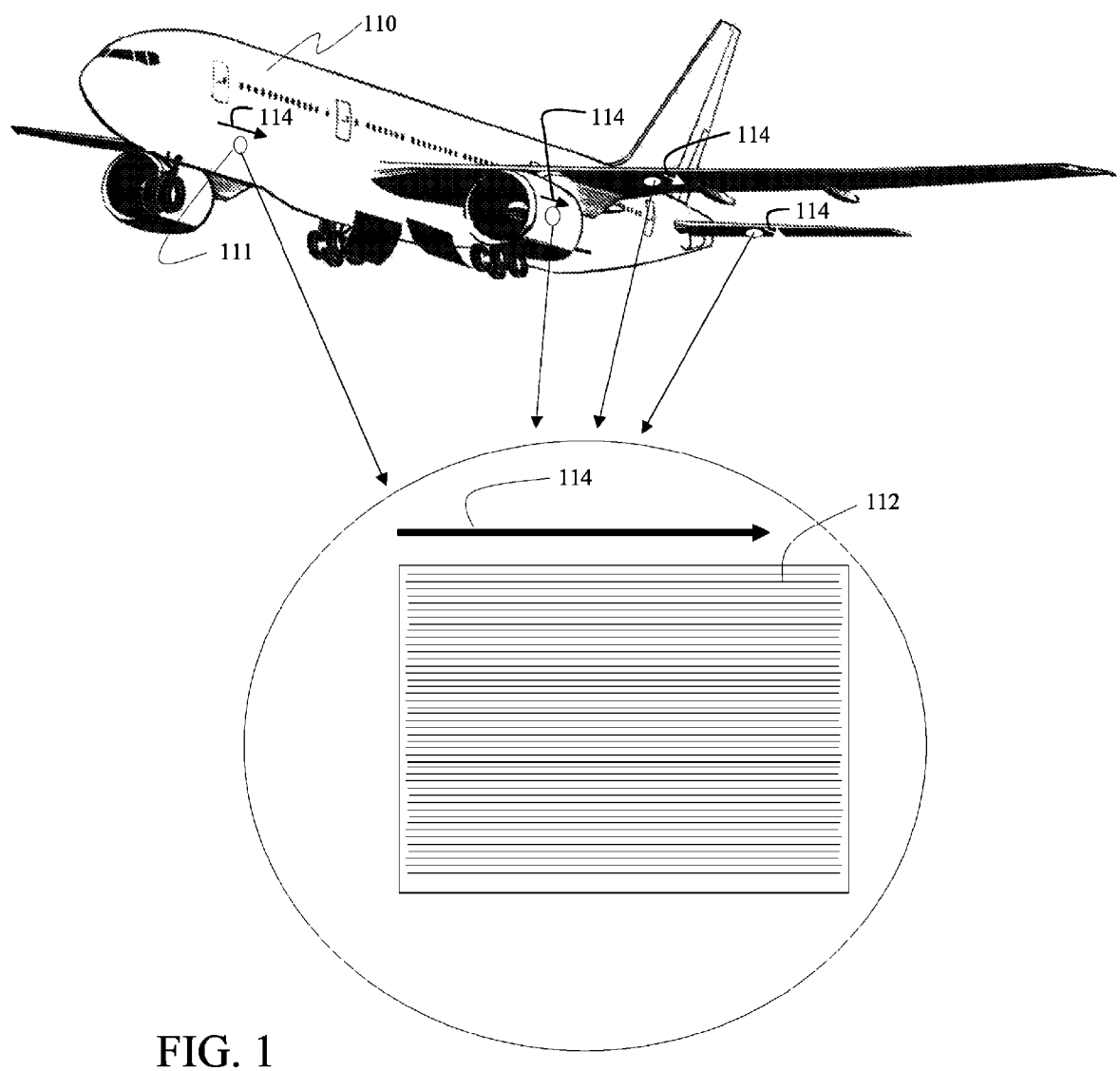
FIG. 1 is an isometric view of a portion of an aerodynamic surface such as a wing or fuselage skin showing exemplary riblets extending in the flow direction.

The embodiments disclosed herein provide recoverable riblets constructed with shape memory materials that may be impacted by ground support equipment or environmental hazards such as hail without permanent deformation/damage. These embodiments also allow a design change in riblets providing the capability for them to be thinner and more aerodynamically efficient. An exemplary embodiment of shape memory riblets having a structure as will be described in greater detail subsequently is shown as a portion of an aerodynamic surface for an aircraft as shown in FIG. 1. The aircraft 110 employs a structure with a surface 111, shown enlarged, having multiple substantially parallel riblets 112 arranged parallel to the flow direction as represented by arrow 114. For the exemplary embodiment shown, the dimension 116 perpendicular to the surface 111 is approximately 0.002 inch while the spacing 118 between the riblets is approximately 0.003 inch as shown for example in FIGS. 2A and 2B. Spacing or distribution of the riblets in an array may vary depending on and be predetermined by the fluid dynamic properties of the air, water or other fluid for which the application of riblets is employed. The aerodynamic surface is typically, without limitation, curved and may be a portion of a wing, an engine nacelle, a control surface, a fuselage or other suitable surface. Therefore flexibility and conformability of the riblets and any structure supporting and affixing the riblets to the surface may be required. While described herein with respect to an aircraft aerodynamic surface the embodiments disclosed herein are equally applicable for drag reduction on surfaces of other aerospace vehicles such as, without limitation, missiles or rockets and other vehicles such as cars, trucks, buses and trains moving in a gaseous fluid, commonly air, or on boats, submarines, hydrofoils, fluid flow conduits or other surfaces exposed to liquid fluid flow.

The embodiments disclosed herein recognize and provide the capability for riblets that may resist various impacts and/or other forces that may reduce riblet durability. Further, certain of the different advantageous embodiments provide a multi-layer structure that may have a support layer and a plurality of riblet tips located on or extending from the support layer. The tips which form the riblets may be fabricated from shape memory materials including shape memory alloys (SMAs), such as copper-zinc-aluminum-nickel, copper-aluminum-nickel, nickel-titanium (NiTi), pseudo-elastic beta titanium alloys and other suitable metal alloys, providing superelastic behavior arising from the reversible stress-induced martensitic phase transformation. The maximum recoverable strain of superelastic SMAs can be several percent in uniaxial tension or compression, enabling a SMA riblet which has experienced deformation to return to its original shape. Shape memory alloys are able to undergo an atomic phase change from higher modulus when at a zero or non-stress state to lower modulus upon the application of a force on shape memory alloy. Higher modulus may be referred to as an austenitic phase, while lower modulus may be referred to as martensitic phase.

When shape memory alloys absorb energy from an applied force, they may temporarily deform in a manner similar to an elastomer. Once the force is removed, the shape memory alloy may return to higher modulus and original shape. For example, without limitation, a NiTi alloy, may absorb around five times the energy of steel and around three times the energy of titanium. An exemplary NiTi shape memory alloy may provide reversible strain properties of up to around eight to around 10 percent strain without permanent deformation of original shape.

In alternative embodiments, the shape memory material is a shape memory elastomer such as, for example without limitation, polyhedral oligosilsesquioxane (POSS)-modified polyurethane or more typical elastomers including polyurethanes, silicones, epoxy, polysulfide, ethylene propylenediene, fluorosilicone, and fluoroelastomers, with a rigid metal coating such as nickel (used for the embodiments described herein) or alternative rigid materials such as chromium, other metal alloys, glass, ceramics, silicon carbide or silicon nitride. The materials of the multilayer structure are flexible and may be formed as an appliqué separately or in combination with the riblets for fastening, bonding, coupling or otherwise attaching to a surface to improve aerodynamics of a vehicle such as an aircraft.

Figure 2A:
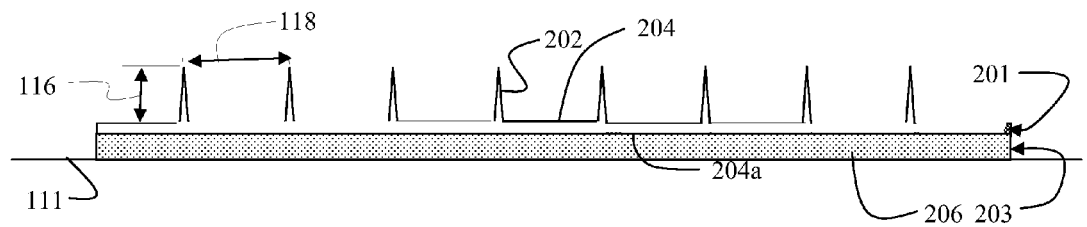
FIG. 2A is a lateral section view perpendicular to the flow direction of a first embodiment for rigid tipped riblets.
Figure 2B:
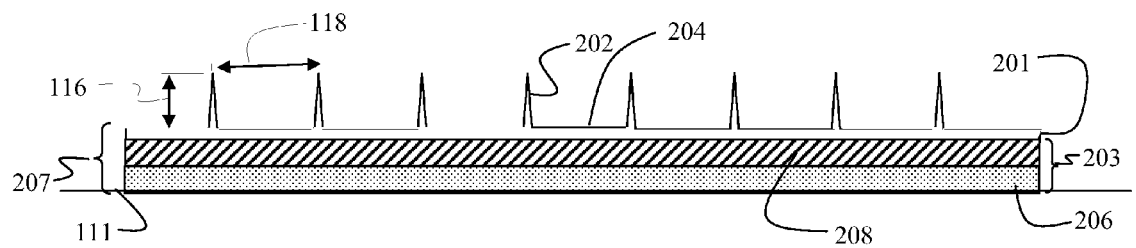
FIG. 2B is a lateral section view of a modification of the embodiment of FIG. 2A with an additional support layer.

A first embodiment for shape memory riblets is shown in FIG. 2A as a multilayer construction. Individual tips 202 of the riblets protrude from a surface layer 204 to provide a first layer 201 of the multilayer construction. The protruding riblets and continuous surface layer are formed by casting or deposition, as will be described in greater detail subsequently, of the shape memory material such as a SMA chosen for providing a desired first characteristic of durability. In an exemplary embodiment, NiTi is employed. For the embodiment shown in FIG. 2A a second layer 203 created by an adhesive layer 206 is deposited on a bottom 204a of the surface layer 204. This adhesive could be one of many possibilities including, without limitation, pressure sensitive acrylic adhesives, polyurethane pressure sensitive adhesives, polysulfide, epoxy, thermoplastics, thermally-reactive adhesives, silicone adhesives, or fluorosilicone adhesives. In alternative embodiments, a supporting polymer layer 208 engages the surface layer 204 intermediate the surface layer 204 and adhesive layer 206 as shown in FIG. 2B as a portion of the second layer. The polymer layer 208 may be a polymer film or other suitable material. In certain embodiments polyetheretherketone (PEEK) is employed as the film. The polymer, adhesive and/or other elements in the second layer provide a second characteristic of resilience and the ability to adhere to the surface.

Figure 2C:
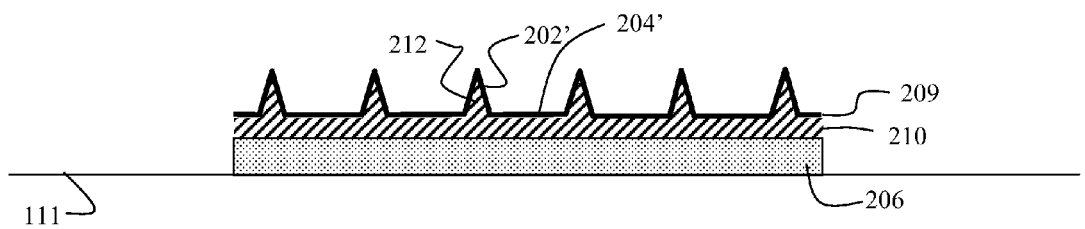
FIG. 2C is a lateral section view of a modification of the embodiment of FIG. 2A with rigid cladding over an elastomer core.

FIG. 2C is an additional alternative embodiment wherein the SMA or alternative shape memory material is employed as a contoured surface cladding 209 forming the tips 202' and surface layer 204' as the first layer of the multilayer construction. As the second layer, an elastomeric layer 210 is then cast into the cladding to provide both a support layer and light weight cores 212 for the tips 202' to maintain the predetermined spaced relation of the tips 202'. Exemplary elastomers may include, without limitation, polyurethanes, silicones, epoxy, polysulfide, ethylene propylenediene, fluorosilicone, and fluoroelastomers This alternative embodiment may allow weight reduction and flexibility of the structure may be further enhanced. Additionally, a shape memory elastomeric material such as polyhedral oligosilsesquioxane (POSS)-modified polyurethane having compatible properties with the SMA surface cladding 209 may be employed for enhancing durability and shape recovery. Employing metal shape memory alloys as the surface cladding 209 may provide the added benefit of resistance to SKYDROL® hydraulic fluid, and therefore help protect the polymeric elastomer cores 212. The elastomeric layer 210 may then be adhered to a surface using an adhesive layer 206 or directly as described with respect to FIG. 2D.

In the form shown in FIG. 2A, 2B or 2C, the embodiment may be fabricated as a multilayer appliqué 207 as shown in FIG. 2B, including tips 202, surface layer 204, polymer layer 208 and adhesive layer 206 which can then be adhered to the aerodynamic surface using the adhesive layer 206.

Figure 2D:
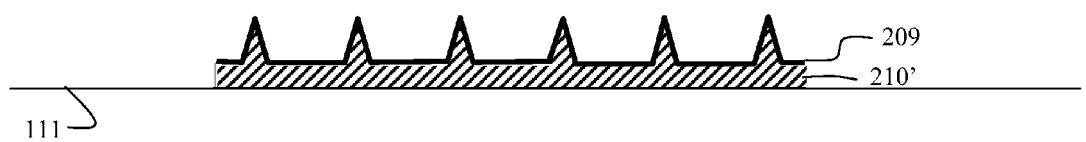
FIG. 2D is a lateral section view of a modification of the embodiment of FIG. 2A without an adhesive layer for direct thermoplastic boding.

In alternative embodiments, the surface layer 204 may be directly adhered to or deposited on the aircraft surface 111. FIG. 2D demonstrates an embodiment similar to that described with respect to FIG. 2C however, no adhesive layer is employed. Elastomeric layer 210' is a thermoplastic (or thermosetting resin such as an epoxy) cast into the SMA cladding 209 which allows direct bonding to the aircraft surface 111 with application of heat.

Figure 2E:
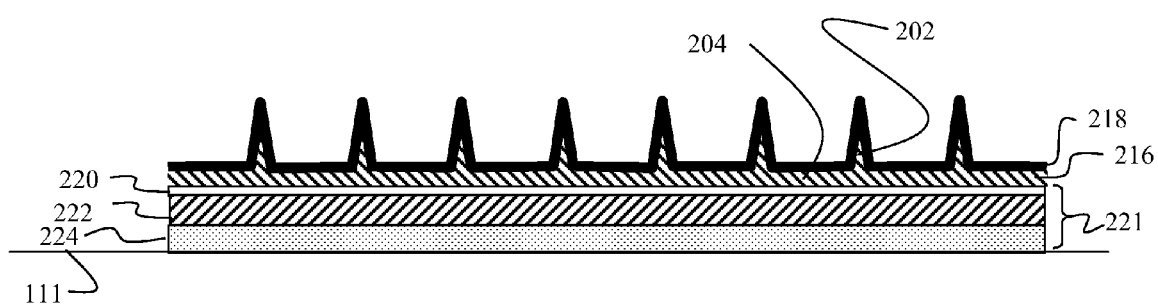
FIG. 2E is a lateral section view of an embodiment employing a rigid metal cladding over a shape memory layer with a multilayer LSP appliqué.

For the embodiment shown in FIG. 2E, the riblet employs shape memory material which may be either a SMA or a shape memory elastomer layer 216 such as polyhedral oligosilsesquioxane (POSS)-modified polyurethane with a thin surface coating or hard layer 218 of a metal such as nickel (used for the embodiments described herein), chromium, other metal alloys or alternative materials such as glass, ceramics, chromium nitride, silicon carbide or silicon nitride deposited in thin layer(s). This structure allows the use of elastomers which may not be resistant to SKYDROL® hydraulic fluid or other solvents with protection of the elastomer provided by the hard layer coating 218. When used with an SMA the hard layer coating 218 may provide additional structural strength or environmental shielding such as enhanced corrosion resistance while retaining the benefit of the shape memory provided by the SMA. This thin or multilayer hard layer coating 218 may also add a decorative appearance through the creation of interference colors.

The thin surface hard layer coating 218 in the embodiment of FIG. 2E may also be an alternative SMA providing multiple shape memory layers with predetermined composition changes across the layers to achieve desired shape memory performance and damage resistance and in some cases provide interference colors. For example, if the material in layer 216 is a beta titanium alloy, a hard layer coating 218 of Nitinol, a nickel titanium shape memory alloy, will allow the generation of decorative colors resulting from oxide formation on the Nitinol surface.

For the embodiment shown, a multilayer structure 221 incorporating a metal mesh or foil 220 such as aluminum, a polymer layer 222 such as PEEK and an adhesive layer 224 supports the shape memory material layer 216. The metal foil 220 provides an additional conducting material for lightning strike protection in an exemplary aircraft usage of the embodiment. The foil, polymer and adhesive multilayer structure 221 may be comparable to a current lightning strike appliqué (LSA) employed for composite aircraft structural surfaces. The metallic tips 202 of the riblet array may provide excellent lightning protection since they are protuberances and basically dielectrically separated from each other and any underlying foil 220 and/or airplane surface 111. With similar performance to Wide Area Lightning Diverter Overlay (WALDO), supporting the lightning energy in a corona on the surface, similar to many small diverter strips. Segmented metal riblets may further enhance the performance.

Figure 2F:
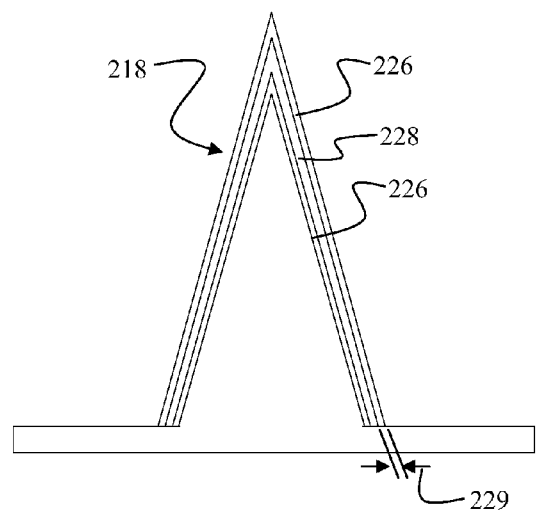
FIG. 2F is a detailed view of one tip with an exemplary multilayer coating on a core.

As shown in FIG. 2F, the hard layer coating 218 may be composed of nanometer size layers of SMA 226 and polymer or oxides 228 for optimal control and durability. The thickness 229 for exemplary embodiments may range from angstroms to hundreds of nanometers, nominally between a lower bound determined by alloys employed and the deposition process and 0.5 mils as an upper bound.

Figure 3:
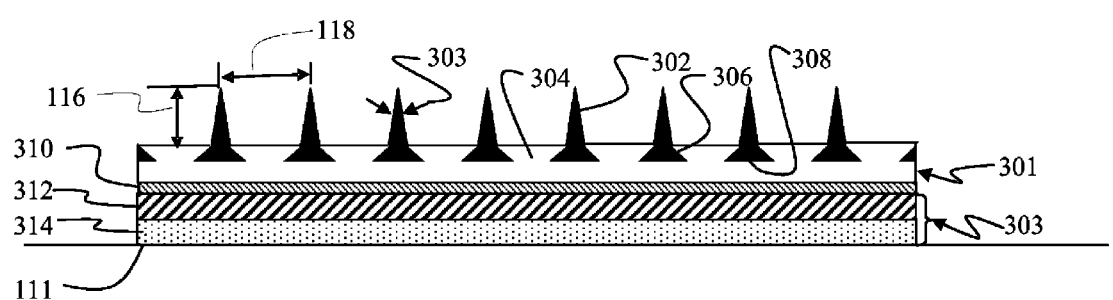
FIG. 3 is a lateral section view of a second embodiment for rigid tipped riblets with lateral structural separation of the riblets.

Another embodiment for shape memory riblets is shown in FIG. 3. With complex or multiple curved surfaces, it may be desirable in the first layer 301 for the individual riblet tips 302 to be separated laterally perpendicular to the flow direction from each other for greater lateral flexibility. For the embodiment shown, individual tips 302 protrude from an elastomeric layer 304. Similar polymer classes, e.g., polyurethane, silicones, epoxy, polysulfide, ethylene propylene-diene, fluorosilicone, and fluoroelastomers, to those disclosed with respect to FIGS. 2A-2E may be employed. However, lower requirements are present in this configuration for the percent elongation of the elastomer. Tips 302 have an internal angle 303 of approximately 30° for the exemplary embodiment of FIG. 3. A base 306 expands from each tip. In certain embodiments the elastomeric layer 304 surrounds the base 306 to provide greater structural continuity. In alternative embodiments a bottom face 308 of the base 306 adheres directly to the exposed surface of the elastomeric layer 304.

The second layer 303 is created by a multilayer structure incorporating a metallic layer 310 which may be a screen or foil such as aluminum, a polymer layer 312 such as PEEK and an adhesive layer 314 supports the elastomeric layer 304. The polymer layer 312 and adhesive layer 314 may be supplied as a portion of a preformed appliqué as described with respect to FIG. 9 below or directly deposited on the elastomeric layer 304. As in the embodiment described with respect to FIG. 2E, the metallic layer 310 provides a conducting material for lightning strike protection in an exemplary aircraft usage of the embodiment. The foil, polymer and adhesive multilayer structure may be comparable to a current lightning strike appliqué (LSA) employed for composite aircraft structural surfaces.

The elastomer layer 304 supporting the shape memory riblet tips 302 provides additional elastic sideways deformation and recovery for the tips 302 when lateral forces are applied thereby further enhancing the durability of the riblet tips. Additionally, the flexible elastomeric layer allows greater ability to conform to complex shapes.

Figure 4:
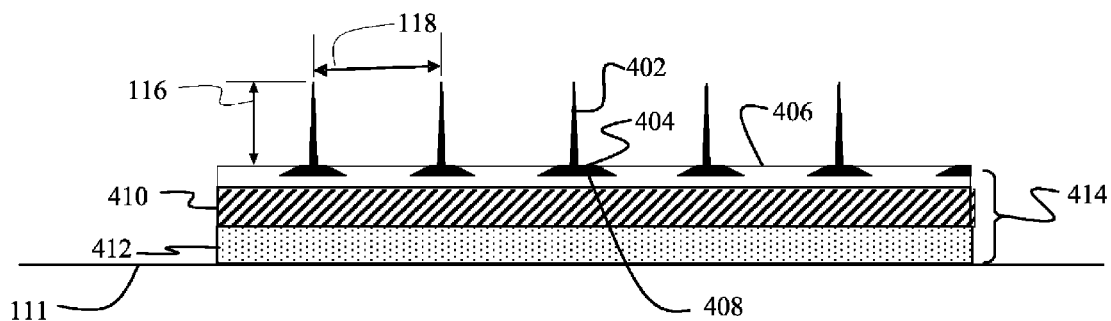
FIG. 4 is a lateral section view of a third embodiment for rigid tipped riblets with reduced cross-section and lateral separation.

FIG. 4 demonstrates a third embodiment for the shape memory riblets 112 of FIG. 1 which takes advantage of the structural capability provided by the material from which the riblets 112 are formed to allow a sharper profile of tips 402. For the embodiment shown in each of the tips 402 extends from a base 404 supported in an elastomer layer 406. As with the embodiment described with respect to FIG. 3 the base 404 of each tip 402 is surrounded by the elastomer to structurally retain the base 404 within the elastomer layer 406. In alternative embodiments the extended bottom surface 408 of the base 404 may be adhered to the surface of the elastomer layer 406. The embodiment of FIG. 4 also employs riblets separated laterally perpendicular to the flow direction as in the embodiment of FIG. 3. However, in alternative embodiments a continuous surface layer from which the tips 402 extend as disclosed for the embodiment described with respect to FIG. 2A may be employed.

As also disclosed in FIG. 4 the embodiment employs a supporting polymer layer 410 on which the elastomer layer 406 is adhered or deposited. An adhesive layer 412 extends from the polymer layer 410 opposite the elastomer layer 406 forming a multilayer appliqué 414.

Figure 5A:
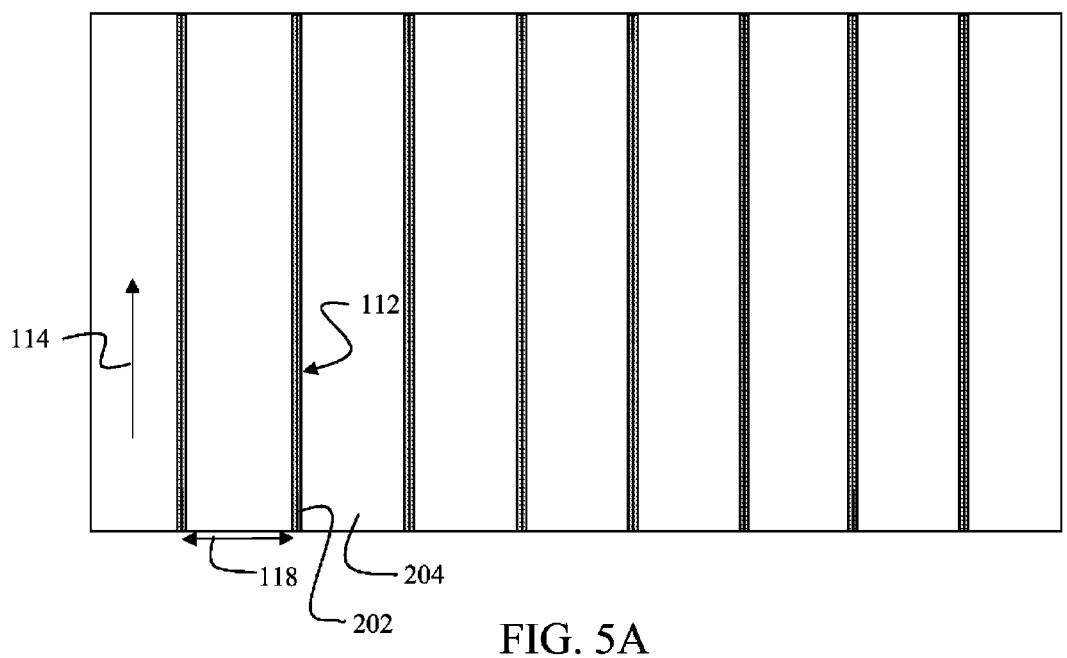
FIG. 5A is a top view of a portion of an aerodynamic surface employing riblets of the first embodiment as shown in FIG. 2B.
Figure 5B:
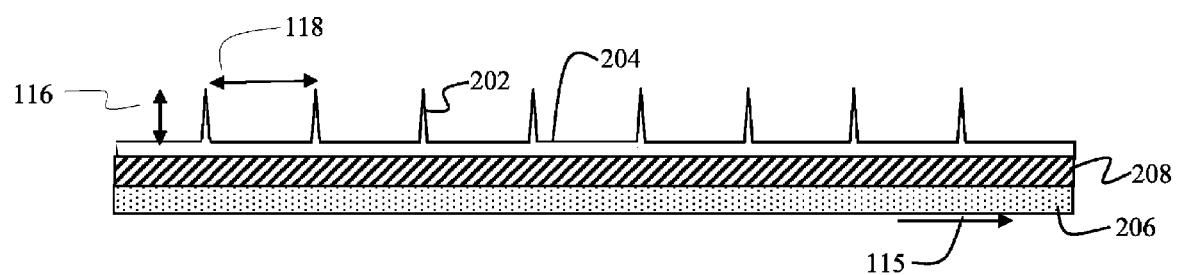
FIG. 5B is a section view comparable to FIG. 2B for reference with the features of FIG. 5A.

FIG. 5A shows a top view of the embodiment as disclosed in FIG. 2B. The riblets 112 formed by the tips 202 expand longitudinally along surface layer 204 in the flow direction 114. The thin surface layer 204 provides for flexibility in adhering to curvature having tangents substantially perpendicular to the riblets 112 as represented by arrow 115. The shape memory materials employed in the riblets 112 have additional advantages. SMA riblets may also provide multifunctional capability and benefits to aircraft structures which include vibration dampening, since shape memory alloys have significant damping capacity, and providing improved damage resistance to underlying composite structures by means of absorbing impact energies via the stress-induced martensitic phase transformation. Additionally, the SMA foil or cladding may provide resistance to electromagnetic effects which composite structure alone may not provide thereby substituting for or supplementing LSA foil appliqués and similar materials.

Figure 6A:
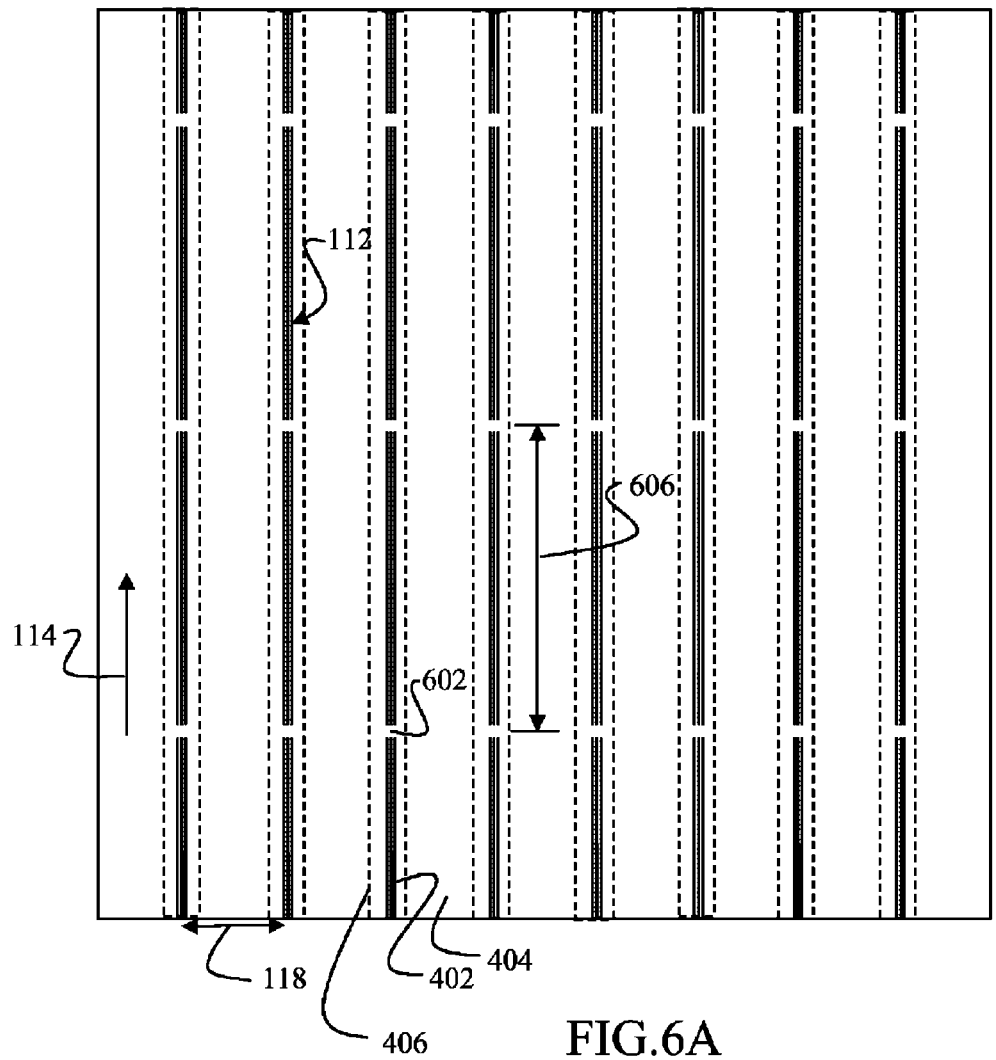
FIG. 6A is a top view of a portion of an aerodynamic surface in pulling riblets of the second embodiment shown in FIG. 3 with additional longitudinal separation of riblet sections.
Figure 6B:
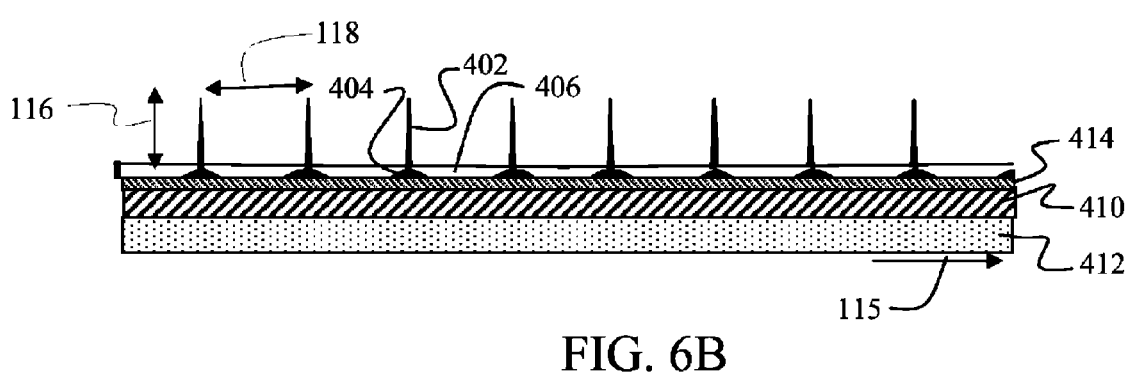
FIG. 6B is a section view comparable to FIG. 3 for reference with the features of FIG. 6A.

However as previously described the surfaces on which the riblets 112 may be employed may have complex or multiple curvatures requiring greater flexibility. The embodiments previously described may therefore be adapted as shown in FIG. 6A wherein the individual tips 402 as previously described with respect to the embodiment of FIG. 4 and shown in modified form in FIG. 6B are laterally separated by spacing 118 substantially perpendicular to the flow direction 114 with bases 404 attached to or captured within an elastomer layer 406. This provides even greater flexibility for adhering to surfaces with curvatures having tangents perpendicular to the riblets 112 as generally defined by arrow 115. The scale of the drawings herein based on the small riblet dimensions makes the surfaces appear flat even though they may be curved in larger scale. Additionally the individual riblets 112 incorporate longitudinal separation using gaps 602 to segment the riblet to provide greater flexibility for adhering to surfaces having curvatures with tangents substantially parallel to the riblets 112. For the embodiment shown gaps 602 may be evenly spaced in the riblets at substantially equal longitudinal distances 606. In alternative embodiments spacing on individual riblets 112 and between riblets 112 may be uneven and chosen in a predetermined manner to accommodate surface curvature as required. In the embodiment shown in FIG. 6B, a metal foil layer 414 is shown for lightning protection when non-metallic tips 402 are employed.

Figure 7:
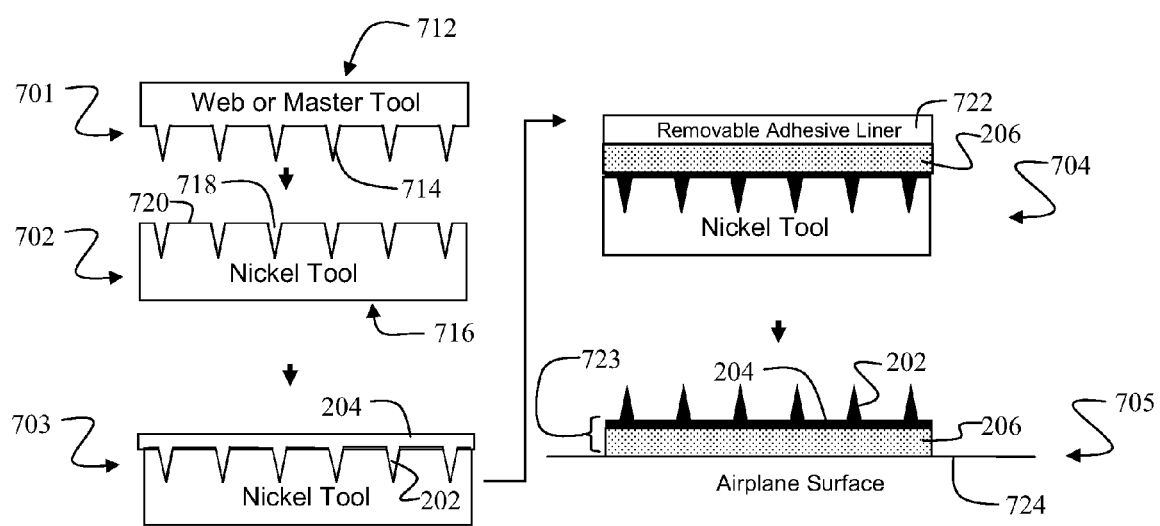
FIG. 7 is a flow diagram of processing steps for an exemplary method of fabrication of riblets of the first embodiment.

FIG. 7 is a flow diagram showing a manufacturing process for a riblet structure as defined in the embodiment described with respect to FIG. 2A. In step 701 a master tool or replication of a master tool 712 is created using, as an example without limitation, diamond machining of a copper form or other suitable material as the master tool on which an acrylate film is cured as a replication and then stripped to define spaced protuberances 714 corresponding to the desired riblet dimensions. The tool 712 as shown in FIG. 7 may be a section of a flat tool, a roller or a rolled film tool (referred to herein as a "web tool") employed for roll-to-roll web processing. In alternative embodiments, a roller may employ, for example a nickel tool partially submerged in the plating bath and as the plated foil is deposited onto the "master" roll it is released/pulled off of the roller which causes the roll to rotate exposing a clean portion of the roller to the electroforming bath. A complimentary tool 716 is created in step 702 by impression on the master tool 712 which provides grooves 718 corresponding to the riblet shape. Spacing between the grooves provides a substantially flat intermediate surface 720 corresponding to the dimension 118 desired between the riblets 112. In step 703 SMA tips 202 and surface layer 204 are deposited onto the complimentary tool 716. Possible deposition methods include plasma spraying, vacuum plasma spraying, sputtering or other physical vapor deposition methods and electroforming. In certain embodiments, a release compound is applied to the surfaces on the complimentary tool to assist in removal of the cast riblet tips 202 and surface layer 204 from the tool 216. Adhesive layer 206 is then applied in step 704 to the surface layer opposite the SMA tips 202. The adhesive layer 206 may be combined with a polymer layer 208 as shown in the embodiment in FIG. 2B and supplied as a preformed appliqué which is then joined with the electro-formed surface layer 204. A removable adhesive liner 722 for handling of the completed multilayer appliqué 723 is added as also shown in step 704. Application to the aircraft surface 724 in step 705 is accomplished by removing the multilayer appliqué 723 from the complimentary tool 716, removal of the adhesive liner 722 followed by attachment of the adhesive layer of the appliqué 723 to aircraft surface 724.

Figure 8A:
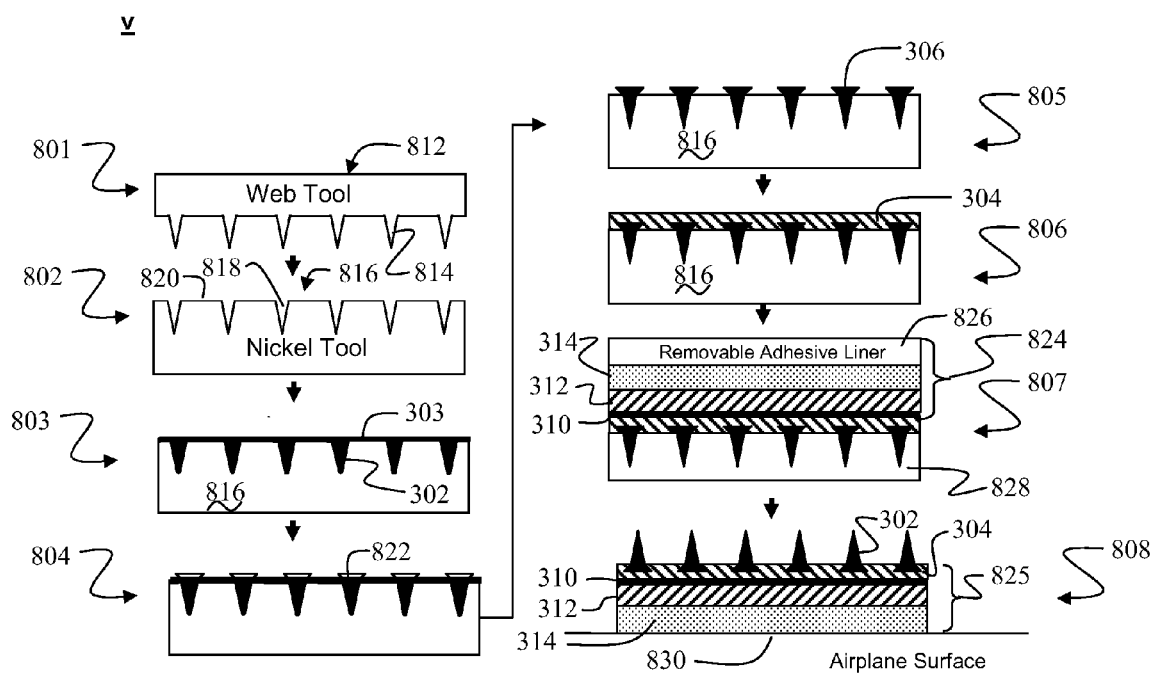
FIG. 8A is a flow diagram of processing steps for an exemplary method of fabrication of riblets of the second embodiment.

FIG. 8A is a flow diagram showing a manufacturing process for a riblet structure as defined in the embodiment described with respect to FIG. 3. In step 801 a master tool 812 is created as previously described with respect to FIG. 7 to define spaced protuberances 814 corresponding to the desired riblet dimensions. The tool as shown in FIG. 8 may be a section of a flat tool, roll tool or a rolled film tool employed for web processing. A complimentary nickel tool 816 is created in step 802 by impression on the master tool 812 which provides grooves 818 corresponding to the riblet shape. Spacing between the grooves provides a substantially flat intermediate surface 820 corresponding to the dimension 118 desired between the riblets 112. SMA tips 302 are electro-formed onto the complimentary tool in step 803 including an intermediate web 303 between the tips. In step 804 resist 822 is applied over the bases 306 of the riblets in the complimentary tool 816. The cast SMA including the web 303 is etched to remove the web 303 and shape the bases 306 of the tips and the resist is then removed in step 805 providing the spaced riblet tips 302 in the tool 816. For the embodiment shown the bases 306 are placed into relief extending from the tool 816 by the etching around the resist. The elastomer layer 304 is then cast over the riblets in step 806. In alternative embodiments electroforming of the SMA tips 302 provides a base flush with the flat surface 820 for direct adherence to the surface of the elastomer layer 304 as previously described with respect to FIG. 3. For the exemplary process shown with respect to FIG. 8A a preformed appliqué 824 comprising the multilayer structure of aluminum foil as a metallic layer 310, polymer layer 312 and adhesive layer 314 is adhered to the cast the elastomer in step 807. A removable adhesive liner 826 for preservation of the adhesive during further processing is shown. The multilayer structure is then removed from the complimentary tool 816 creating a multilayer riblet array appliqué 825 exposing the SMA tips 302. Masking 828 is applied over the tips and elastomer to assist in handling during additional processing. The masking in exemplary embodiments may be a solution cast releasable polymer such as silicon or an adhesive film such as MYLAR® polyester film with a low tack acrylic adhesive applied during roll processing.

The completed multilayer riblet array appliqué 825 may then be applied to an airplane surface 830 by removing the adhesive liner 826 and adhering the adhesive layer 314 to the aircraft surface 830 as shown in step 808. The masking is then removed from the tips 302 and elastomer layer 304 providing the completed riblet surface.

The shape memory materials employed for the tips as described in the embodiments and fabrication processes herein allows very fine tip structure having dimensions of around 25 microns at the base with the extreme end of the tips having nanometer dimensions. Even thought the tips are very sharp, the very fine spacing of the tips avoids cuts in normal handling by installation personnel.

Figure 8B:
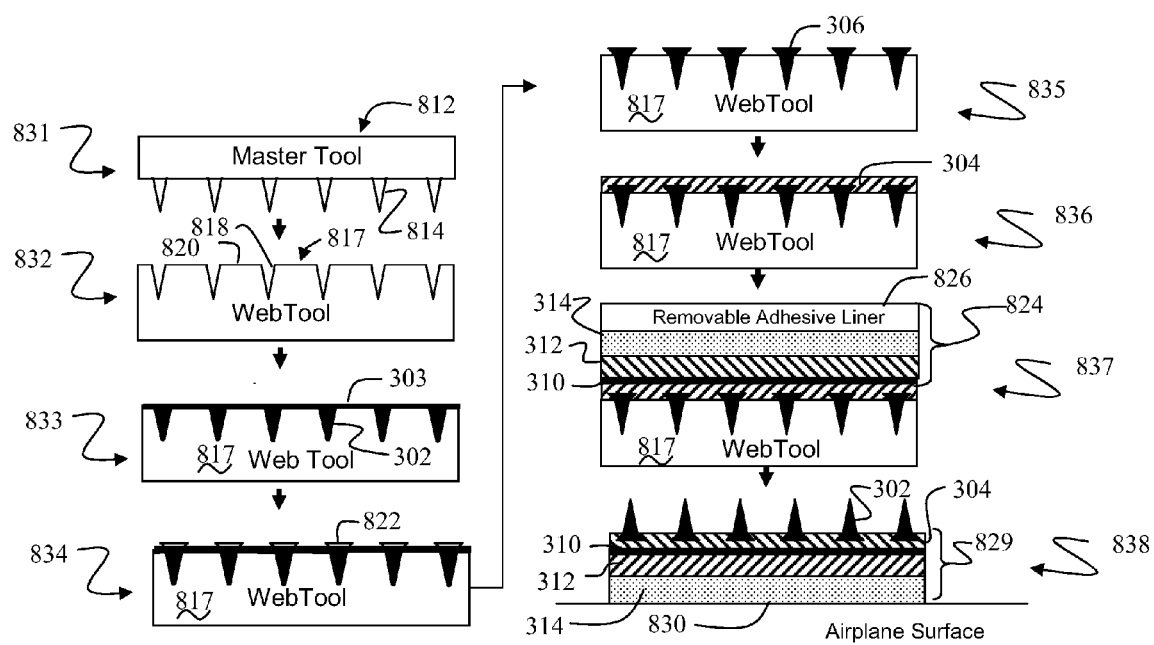
FIG. 8B is a flow diagram of processing steps for a second exemplary method of fabrication of the riblets of the second embodiment using web processing tools.

Web processing employing film/web tools as opposed to the nickel tools disclosed in the process of FIG. 8A may be employed for the embodiments disclosed. An exemplary web tool may employ a higher temperature polymer such as a silicone or polyimide. Plasma spraying and sputtering of SMAs may be accomplished on polyimide films. As shown in FIG. 8B, a master tool 812 created in step 831 is employed to create the desired web tool 817. The web tool 817 is created in step 832 by impression on the master tool which provides grooves 818 corresponding to the riblet shape. Spacing between the grooves 818 provides a flat intermediate surface 820 corresponding to the dimension 118 desired between the riblets 112. SMA tips 302 are electro-formed onto the web tool 817 in step 833 including an intermediate web 303 between the tips 302. In step 834 resist 822 is applied over the bases 306 of the riblets in the web tool 817. The cast SMA including the web 303 is etched to remove the web 303 and shape the bases 306 of the tips 302 and the resist is then removed in step 805 providing the spaced riblet tips 302 in the web tool 817. For the embodiment shown the bases 306 are placed into relief extending from the tool 817 by the etching around the resist. The elastomer layer 304 is then cast over the bases 306 of the tips 302 in step 836. In alternative embodiments electroforming of the SMA tips 302 provides a base flush with the flat surface 820 for direct adherence to the elastomer surface as previously described with respect to FIG. 3. For the exemplary process shown with respect to FIG. 8B a preformed appliqué 824 comprising the multilayer structure of aluminum foil as a metallic layer 310, polymer layer 312 and adhesive layer 314 is adhered to the cast the elastomer in step 837. A removable adhesive liner 826 for preservation of the adhesive during further processing is shown. The completed multilayer appliqué 829 may then be applied to an airplane surface 830 by removing the adhesive liner 826 and adhering the adhesive layer 306 to the surface 830 as shown in step 838. The web tool 817 is then removed from the tips 302 and elastomer layer 304 providing the completed the riblet surface.

Figure 8C:
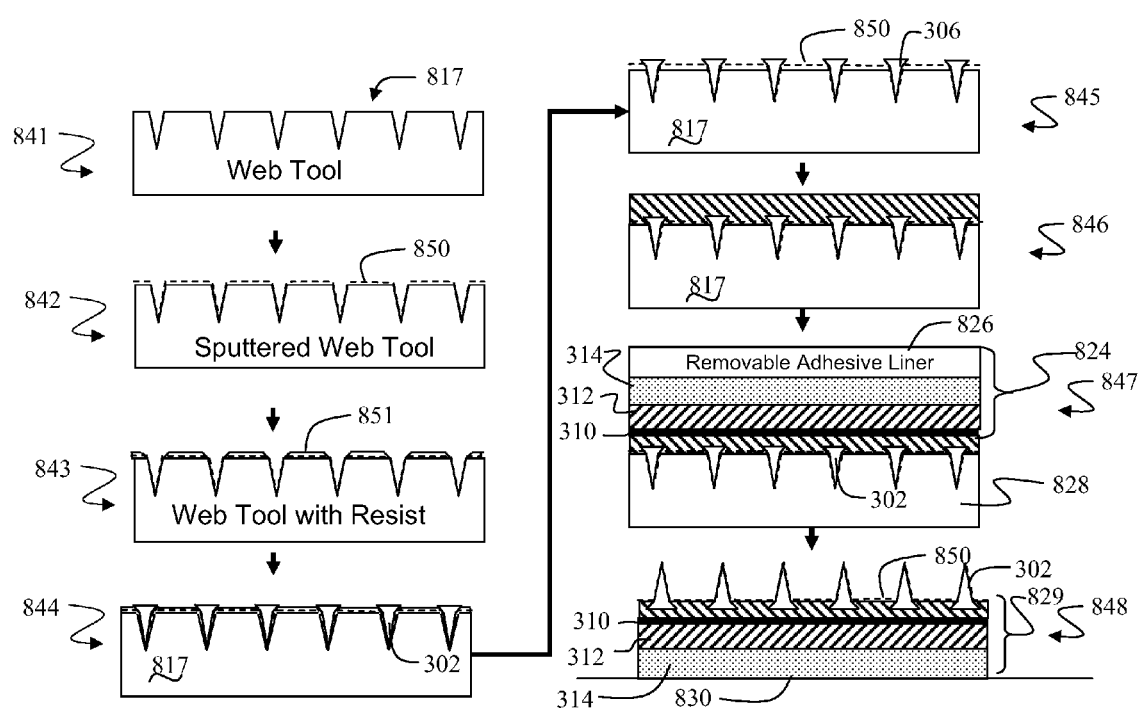
FIG. 8C is a flow diagram of processing steps for a third exemplary method of fabrication of the riblets of the second embodiment using web processing tools with a sputtered metal coating.

Another alternative web process is shown in FIG. 8C. As shown in the figure, a web tool 817 is created in step 841 by impression on a master tool as previously described which provides grooves 818 corresponding to the riblet shape. Spacing between the grooves provides a substantially flat intermediate surface 820 corresponding to the dimension 118 desired between the riblets 112. A sputtered metal coating, generally designated by dashed line 850, is applied to the web tool 817 in step 842 and a resist layer 851 is applied over the sputtered coating 850 in step 843. SMA tips 302 are then electro-formed onto the web tool 817 over the resist layer 851 in step 844. The present method eliminates the intermediate web between the tips of the process described with respect to FIG. 8B. In step 845 the resist is removed. For the embodiment shown the bases 306 are placed into relief extending from the tool by the electroforming over the resist. The elastomer layer 304 is then cast over the riblet tips 302 in step 846. For the exemplary process shown with respect to FIG. 8C a preformed appliqué 824 incorporating the multilayer structure of aluminum foil as a metallic layer 310, polymer layer 312 and adhesive layer 314 is adhered to the cast elastomer in step 847 and the complimentary tool 816 is removed and replaced with a masking 828 as previously described with respect to FIG. 8A. A removable adhesive liner 826 for preservation of the adhesive during further processing is shown. The completed multilayer appliqué 829 may then be applied to an airplane surface 830 by removing the adhesive liner 826 and adhering the adhesive layer 314 to the surface 830 as shown in step 848. The sputtered metal coating 850 may also be selectively removed from the tips or the elastomer with removal of the resist in step 845 or after application to the aircraft. The sputter metal coating 850 may remain as an environmental protective coating for the tips 302 and/or elastomeric layer 304.

Figure 9A:
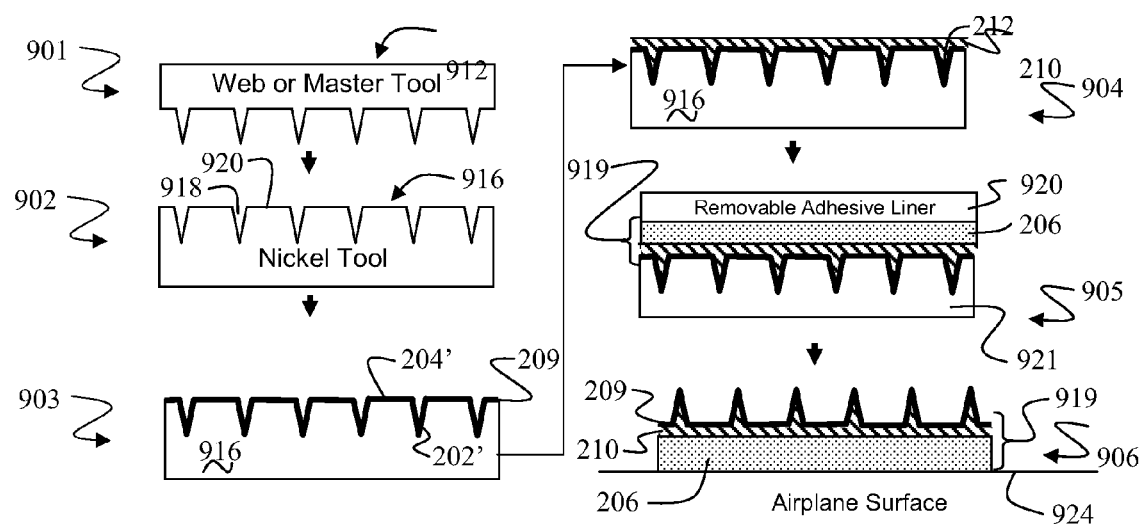
FIG. 9A is a flow diagram of processing steps for an exemplary method of fabrication of riblets of the third embodiment.

FIG. 9A is a flow diagram showing a manufacturing process for a riblet structure as defined in the embodiment described with respect to FIG. 2A. In step 901 a master tool 912 is created using, as previously described with respect to FIG. 7. The tool 912 as shown in FIG. 9A may be a section of a flat tool, roller or a rolled film tool employed for roll-to-roll web processing. For the embodiment shown in FIG. 9A SMA is employed for the shape memory tips 202'. A complimentary tool 916 is created in step 902 by impression on the master or rolled film tool 912 which provides grooves 918 corresponding to the riblet shape. Spacing between the grooves provides a substantially flat intermediate surface 920 corresponding to the dimension 118 desired between the riblets. In step 903 SMA film or cladding 209 is deposited into the complimentary tool 916 to form shape memory tips 202' and surface layer 204'. In certain embodiments, a release compound is applied to the surfaces on the complimentary tool 916 to assist in removal of the tips 202' and surface layer 204' from the tool. Elastomeric layer 210 is then cast into the cladding 209 to provide both a support layer and light weight cores 212 for the tips in step 904. Adhesive layer 206 is then applied in step 905 to the surface layer 204' opposite the tips 202' to create an appliqué 919 which is then removed from the tool. A removable adhesive liner 920 and a masking film 921 for handling of the completed appliqué 919 are added as also shown in step 905. Application to the aircraft surface 922 is accomplished as shown in step 906 by removal of the adhesive liner 920 followed by attachment of the adhesive layer 206 of the appliqué 919 to aircraft surface 922. Removal of the masking 921 completes the riblet appliqué processing.

Figure 9B:
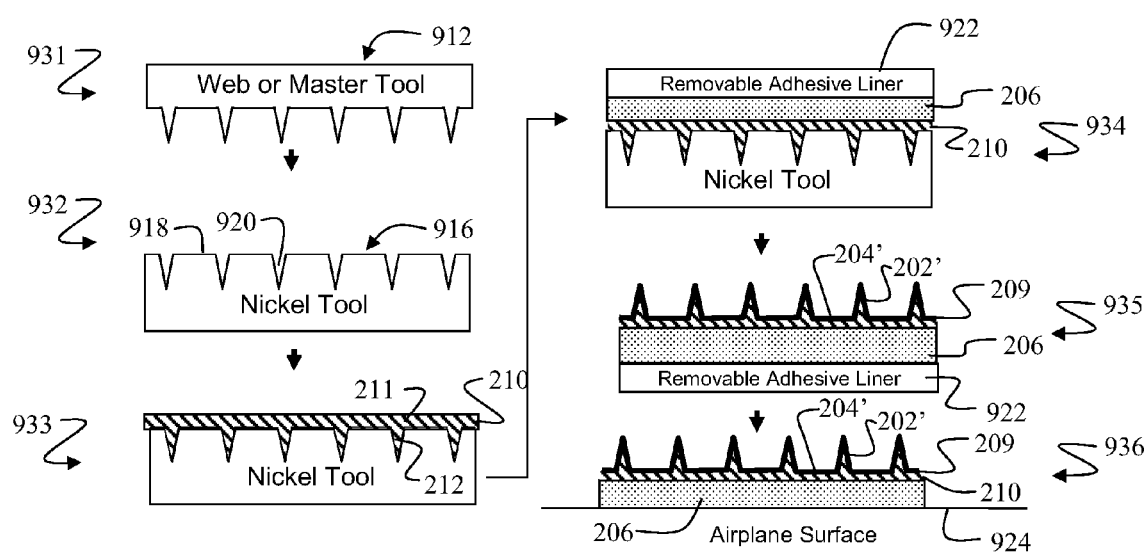
FIG. 9B is a flow diagram of processing steps for an exemplary method of fabrication of riblets of an alternative to the third embodiment with deposition of the cladding.

FIG. 9B is a flow diagram showing an alternative manufacturing process for a riblet structure as defined in the embodiment described with respect to FIG. 2A. In step 931 a master tool 912 is created using, as previously described with respect to FIG. 9A. The tool as shown in FIG. 9B may be a section of a flat tool, roller or a rolled film tool employed for roll-to-roll web processing. A complimentary tool 916 is created in step 932 by impression on the master tool 912 which provides grooves 918 corresponding to the riblet shape. Spacing between the grooves provides a substantially flat intermediate surface 920 corresponding to the dimension 118 desired between the riblets 112. A core layer 210 is then cast into the complimentary tool 916 to provide both a support layer 211 and light weight cores 212 for the tips in step 933. In certain embodiments, a release compound is applied to the surfaces on the complimentary tool 916 to assist in removal of the core layer 210 from the tool. Adhesive layer 206 is then applied in step 934 to the core layer 210 opposite the elastomeric tip cores 212. A removable adhesive liner 922 for handling of the completed appliqué is added as also shown in step 934. In step 935, which may be conducted prior to the addition of the adhesive and liner, the core layer 210 is removed from the complimentary tool 916 and a film or cladding 209 is deposited by sputtering or alternative deposition technique onto the core layer 210 to form shape memory tips 202' and surface layer 204'. In various embodiments, the core layer 210 may be an elastomeric which may or may not have shape memory properties or a SMA. Similarly, the cladding 209 may be a SMA or, if the core is either a shape memory elastomeric or a SMA, the cladding may be a stiff metal or other material such as nickel, chromium, glass, ceramics, silicon carbide or silicon nitride. Alternatively the cladding 209 may be an amorphous metal. The cladding 209 may also be multilayer or interference film, for example an oxide layer used for color and decorative effects. These interference films may be deposited or may be a conversion of the SMA or other metal on the surface. Application to the aircraft surface 824 is accomplished as shown in step 936 by removal of the adhesive liner 922 followed by attachment of the adhesive layer 206 to aircraft surface 924.

Figure 10:
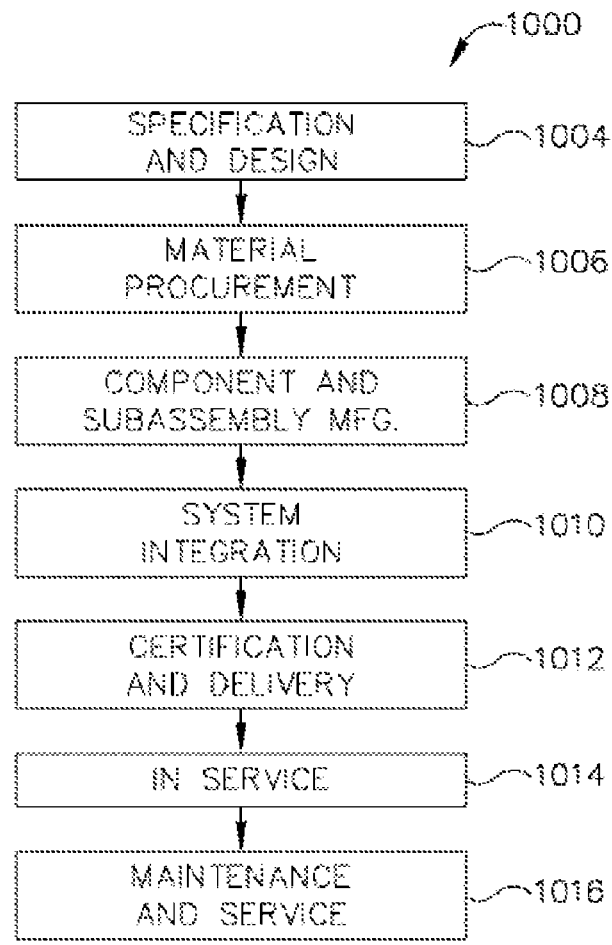
FIG. 10 is a flow diagram describing use of the rigid tipped riblets embodiments disclosed herein in the context of an aircraft manufacturing and service method.
Figure 11:
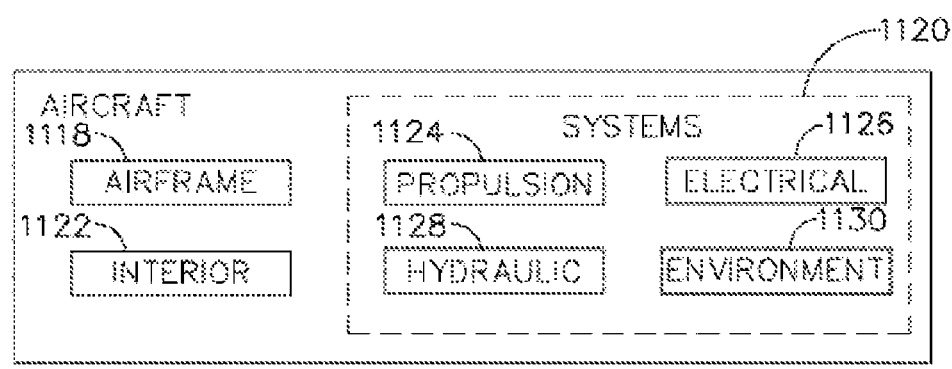
FIG. 11 is a block diagram representing an aircraft employing the rigid tipped riblets with embodiments as disclosed herein.

Referring more particularly to FIGS. 10 and 11, embodiments of the shape memory riblets disclosed herein and the methods for their fabrication may be described in the context of an aircraft manufacturing and service method 1000 as shown in FIG. 10 and an aircraft 1102 as shown in FIG. 11. During pre-production, exemplary method 1000 may include specification and design 1004 of the aircraft and material procurement 1006. During production, component and subassembly manufacturing 1008 and system integration 1010 of the aircraft takes place. The riblet appliqués and their manufacturing processes as described herein may be accomplished as a portion of the production, complement and subassembly manufacturing step 1008 and/or as a portion of the system integration 1010. Thereafter, the aircraft may go through certification and delivery 1012 in order to be placed in service 1014. While in service by a customer, the aircraft 1002 is scheduled for routine maintenance and service 1016 (which may also include modification, reconfiguration, refurbishment, and so on). The riblet appliqués as described herein may also be fabricated and applied as a portion of routine maintenance and service 1016.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 1102 produced by exemplary method 1000 may include an airframe 1118 having a surface 111 as described with respect to FIG. 1 and a plurality of systems 1120 and an interior 1122. Examples of high-level systems 1120 include one or more of a propulsion systems 1124, an electrical and avionics system 1126, a hydraulic system 1128, and an environmental system 1130. Any number of other systems may be included. The shape memory riblets supported by the embodiments disclosed herein may be a portion of the airframe 1118, notably the finishing of skin and exterior surfaces. Although an aerospace example is shown, the principles disclosed in the embodiments herein may be applied to other industries, such as the automotive industry and the marine/ship industry.

Apparatus and methods embodied herein may be employed during any one or more of the stages of the production and service method 1000. For example, components or subassemblies corresponding to production process 1008 may be fabricated or manufactured in a manner similar to components or subassemblies produced while the aircraft 1102 is in service. Also, one or more apparatus embodiments, method embodiments, or a combination thereof may be utilized during the production stages 1008 and 1010, for example, by substantially expediting assembly of or reducing the cost of an aircraft 1102. Similarly, one or more of apparatus embodiments, method embodiments, or a combination thereof may be utilized while the aircraft 1102 is in service, for example and without limitation, to maintenance and service 1016.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. A multilayer construction for an array of riblets comprising:
   a first layer having a plurality of individual laterally spaced tips each with an integral base expanding laterally beyond the periphery of the tip bottom surface, said tips consisting of a superelastic shape memory material in an austenitic form in a non-stress state; and,
   a polymer layer surrounding the base of each of said tips in predetermined spaced relation, said polymer layer adhering to a vehicle surface.

2. The multilayer construction for an array of riblets as defined in claim 1 wherein the tips are formed from shape memory alloy (SMA) material selected from the set of copper-zinc-aluminum-nickel, copper-aluminum-nickel, nickel-titanium (NiTi) and nickel-free, pseudo-elastic beta titanium alloy.

3. The multilayer construction for an array of riblets as defined in claim 1 wherein the first layer includes a surface layer continuously cast with the tips.

4. The multilayer construction for an array of riblets as defined in claim 3 further comprising a polymer support layer deposited on the surface layer opposite the tips.

5. The multilayer construction for an array of riblets as defined in claim 4 further comprising an adhesive layer deposited on the polymer support layer to form a multilayer appliqué, said adhesive layer adhering the appliqué to the vehicle surface.

6. The multilayer construction for an array of riblets as defined in claim 1 further comprising an adhesive layer deposited on the polymer layer forming an appliqué, said adhesive layer adhering the appliqué to the vehicle surface.

7. The multilayer construction for an array of riblets as defined in claim 1 wherein each tip is longitudinally segmented.

* * * * *